United States Patent
Moorti et al.

(10) Patent No.: US 8,116,290 B2
(45) Date of Patent: *Feb. 14, 2012

(54) REDUCED INTERFRAME SPACING IN A WIRELESS LAN RECEIVER

(75) Inventors: Rajendra Tushar Moorti, Mountain View, CA (US); Matthew J. Fischer, Mountain View, CA (US); George Kondylis, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 11/558,890

(22) Filed: Nov. 10, 2006

(65) Prior Publication Data

US 2007/0217378 A1    Sep. 20, 2007

Related U.S. Application Data

(60) Provisional application No. 60/735,412, filed on Nov. 11, 2005.

(51) Int. Cl.
*H04J 3/24* (2006.01)
*H04J 3/00* (2006.01)
*G04F 3/00* (2006.01)

(52) U.S. Cl. ........... 370/338; 370/349; 370/336; 710/10
(58) Field of Classification Search .................. 370/338, 370/230, 294; 455/67.11, 101, 452.2, 130, 455/452, 445; 701/213; 375/295; 710/30
See application file for complete search history.

(56) References Cited

U.S. PATENT DOCUMENTS

| | | | |
|---|---|---|---|
| 2005/0135284 A1* | 6/2005 | Nanda et al. | 370/294 |
| 2005/0181800 A1* | 8/2005 | Trachewsky et al. | 455/452.1 |
| 2006/0034248 A1* | 2/2006 | Mishra et al. | 370/349 |
| 2006/0056362 A1* | 3/2006 | Jang et al. | 370/336 |
| 2006/0195629 A1* | 8/2006 | Sharma et al. | 710/30 |
| 2007/0060141 A1* | 3/2007 | Kangude et al. | 455/445 |

* cited by examiner

*Primary Examiner* — George Eng
*Assistant Examiner* — Nizar Sivji
(74) *Attorney, Agent, or Firm* — Garlick Harrison & Markison; Kevin L. Smith

(57) ABSTRACT

A receiver in a wireless local area network capable of receiving and processing plurality of frames that are separated by a reduced interframe spacing interval. Upon receiving a frame, the receiver determines whether the received frame is using Reduced Interframe Spacing intervals. When the received frame includes a RIFS indicator, acknowledgment of the received frame is suppressed, and subsequent frames of the plurality of frames are received at a RIFS interval.

12 Claims, 11 Drawing Sheets portion of receiver protocol stack 140 receiver in RIFS receive mode normal (non-RIFS) receive mode frame processing for RIFS receive mode

REDUCED INTERFRAME SPACING IN A WIRELESS LAN RECEIVER

CROSS REFERENCE TO RELATED APPLICATIONS

This application claims priority to U.S. Provisional Application Ser. No. 60/735,412 entitled "Reduced Interframe Spacing in a Wireless LAN Receiver," filed Nov. 11, 2005, expired, which is hereby incorporated herein by reference in its entirety for all purposes.

TECHNICAL FIELD

The present invention relates to wireless communications and, more particularly, to increasing data throughput in wireless communications.

RELATED ART

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services ("AMPS"), digital AMPS, global system for mobile communications ("GSM"), code division multiple access ("CDMA"), local multi-point distribution systems ("LMDS"), multi-channel-multi-point distribution systems ("MMDS"), and/or variations thereof.

Depending on the type of wireless communication system, a wireless communication device, such as a cellular telephone, two-way radio, personal digital assistant ("PDA"), personal computer ("PC"), laptop computer, home entertainment equipment, etc., communicates directly or indirectly with other wireless communication devices. For direct communications (also known as point-to-point communications), the participating wireless communication devices tune their receivers and transmitters to the same channel or channels (for example, one of a plurality of radio frequency ("RF") carriers of the wireless communication system) and communicate over that channel(s). For indirect wireless communications, each wireless communication device communicates directly with an associated base station (for example, for cellular services) and/or an associated access point (for example, for an in-home or in-building wireless network) via an assigned channel. To complete a communication connection between the wireless communication devices, the associated base stations and/or associated access points communicate with each other directly, via a system controller, via a public switch telephone network ("PSTN"), via the Internet, and/or via some other wide area network.

Each wireless communication device includes a built-in radio transceiver (that is, receiver and transmitter) or is coupled to an associated radio transceiver (for example, a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency ("IF") stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

One common problem in processing a plurality of frames is that the handshaking protocols between a destination station and a source station reduce the efficiency and level of data throughput. What is needed, therefore, is a refined protocol that increases the efficiency and data throughput between stations within a network.

SUMMARY OF THE INVENTION

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
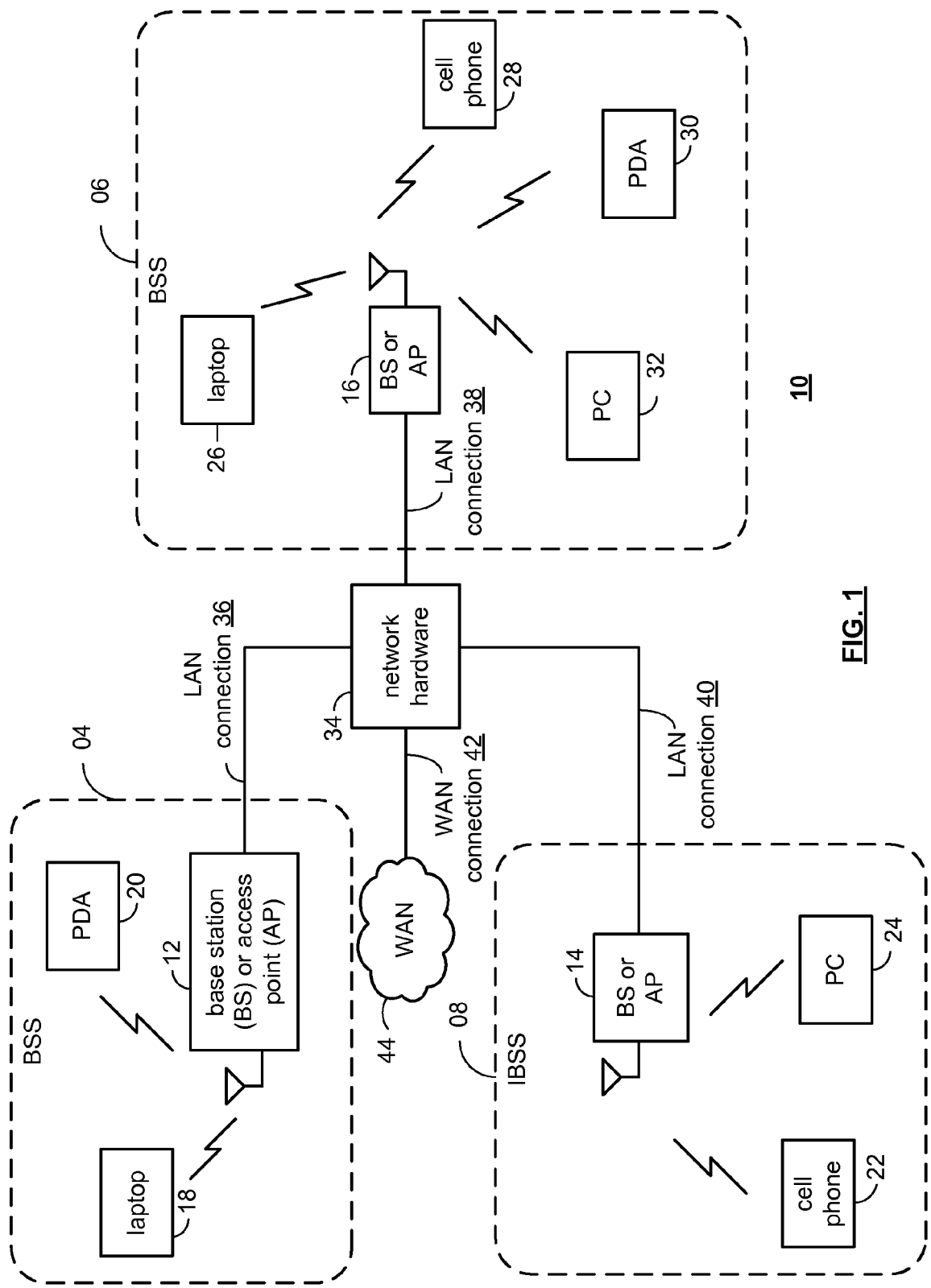
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points ("APs") 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2 through 11.

The base stations or APs 12-16 are operably coupled to the network hardware component 34 via local area network ("LAN") connections 36, 38 and 40. The network hardware component 34, which may be a router, switch, bridge, modem, system controller, etc., provides a wide area network ("WAN") connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (that is, point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

In general, higher data throughput between wireless communication devices can be recognized by reducing the length of interframe spacing intervals between frames and/or fragments, and by suppressing acknowledgment responses from a receiving or destination station. As an example, a wireless communication device such as laptop 26 can receive transmissions in a first receiving mode utilizing conventional interframe spacing intervals for wireless transmission functions, and a second receiving mode utilizing a reduced interframe spacing ("RIFS") interval to increase frame throughput (and correspondingly, data throughput) to the destination station (such as the base station or access point 16 and/or wireless communication devices such as laptop 26, cell phone 28, PDA 30, and/or PC 32). Further to this example, in a reduced interframe spacing interval, the laptop 26 suppresses acknowledgment responses to received frame transmissions from the access point 16, decreasing the time used in frame transfer, and associated data, to the access point 16. The increased data throughput resulting from reduced transmission intervals and/or acknowledgement suppression is discussed in detail regarding FIGS. 2 through 11.

Figure 2:
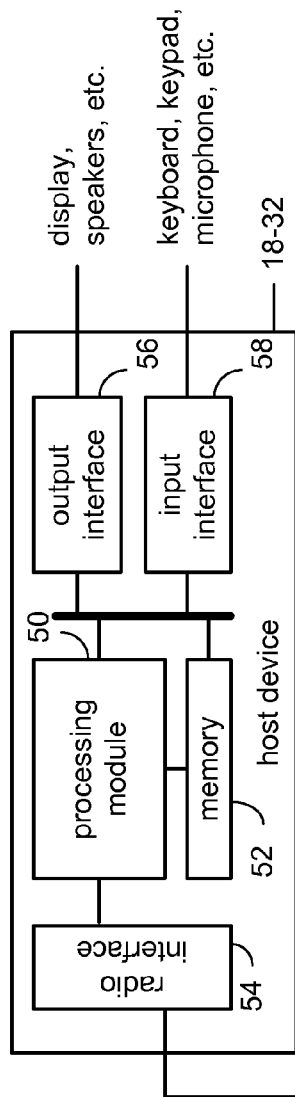
FIG. 2 is a schematic block diagram illustrating a wireless communication host device and an associated radio according to one embodiment of the invention.
Figure 2:
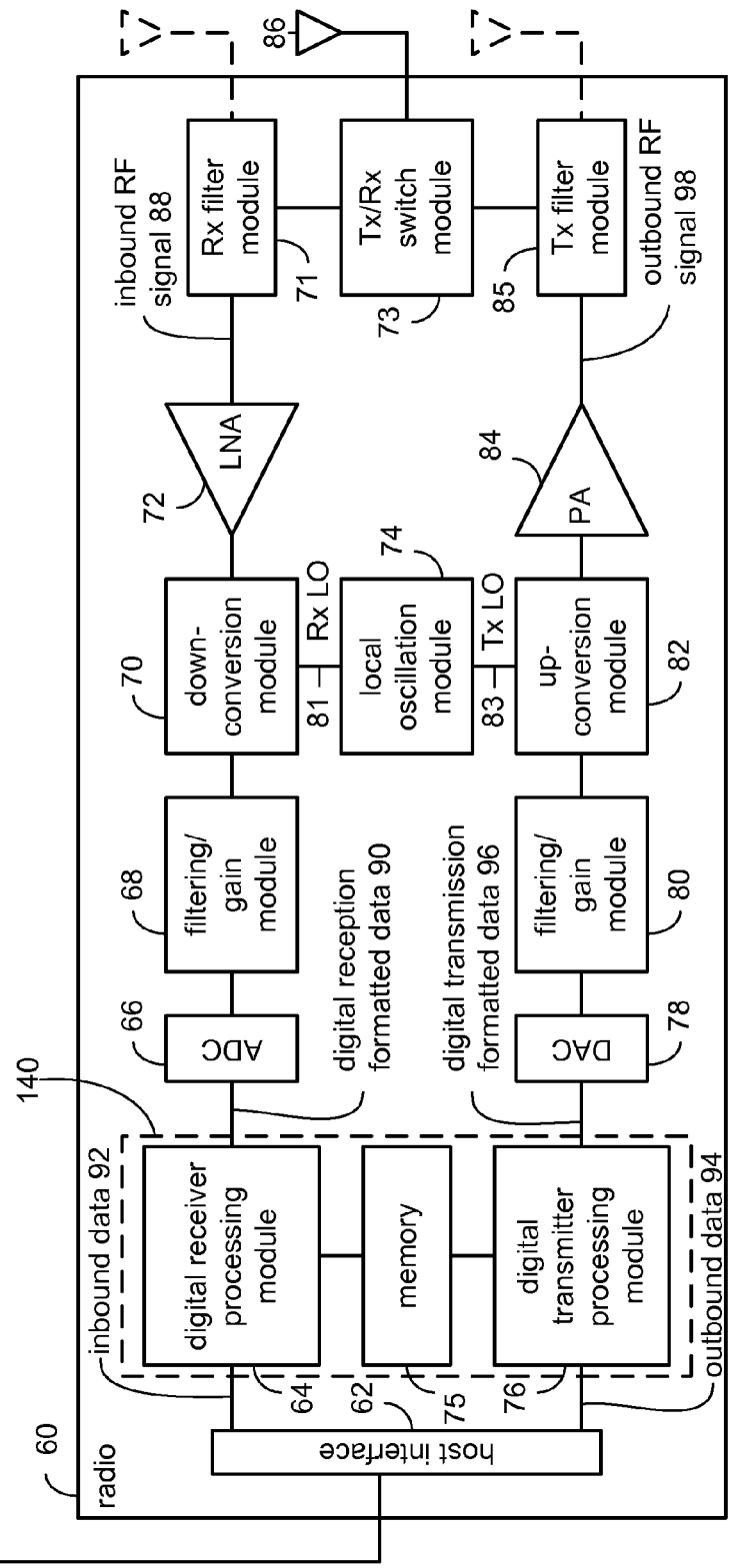

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (for example, inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver ("Tx/Rx") switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. The digital receiver processing module 64 and the digital transmitter processing module 76, in combination with operational instructions stored in memory 75, implement a protocol stack 140, which is generally based upon the Open Systems Interconnection ("OSI") model, which includes a medium access control ("MAC") layer and a physical ("PHY") layer. The interaction between the MAC layer and the PHY layer provides a RIFS mode of operation to the radio 60, such that the radio 60 can receive frames at a reduced interframe spacing ("RIFS") to increase the data rate transfer rate with a destination station. Implementing a receive mode utilizing RIFS intervals, in the context of a protocol stack 140 that includes a MAC layer and a PHY layer, will be discussed in detail with reference to FIGS. 4 through 11.

Digital receiver and transmitter processing modules 64 and 76, respectively, may be implemented using a shared processing device, individual processing devices, or a plurality of processing devices. Such a processing device may be a microprocessor, micro-controller, digital signal processor, micro-computer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (for example, IEEE 802.11a, IEEE 802.11b, 802.11g, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of ordinary skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76.

Local oscillation module 74 includes circuitry for adjusting an output frequency of a local oscillation signal provided therefrom. Though it is not shown here in FIG. 2, in one embodiment of the invention, local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency prior to conversion to a baseband frequency.

Figure 3:
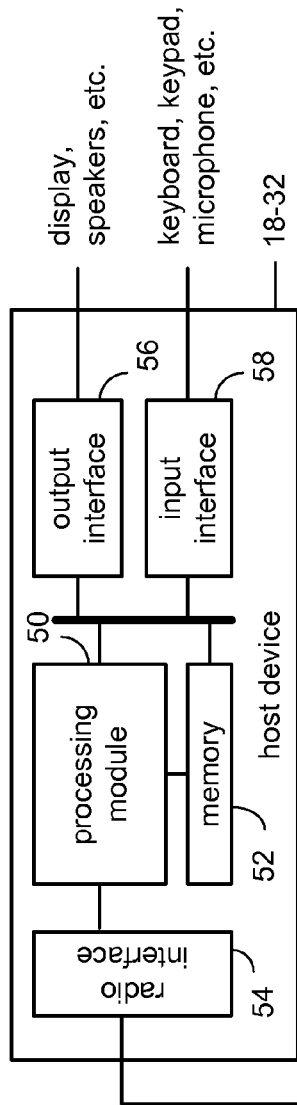
FIG. 3 is a schematic block diagram illustrating a wireless communication device that includes a host device and an associated radio according to another embodiment of the invention.
Figure 3:
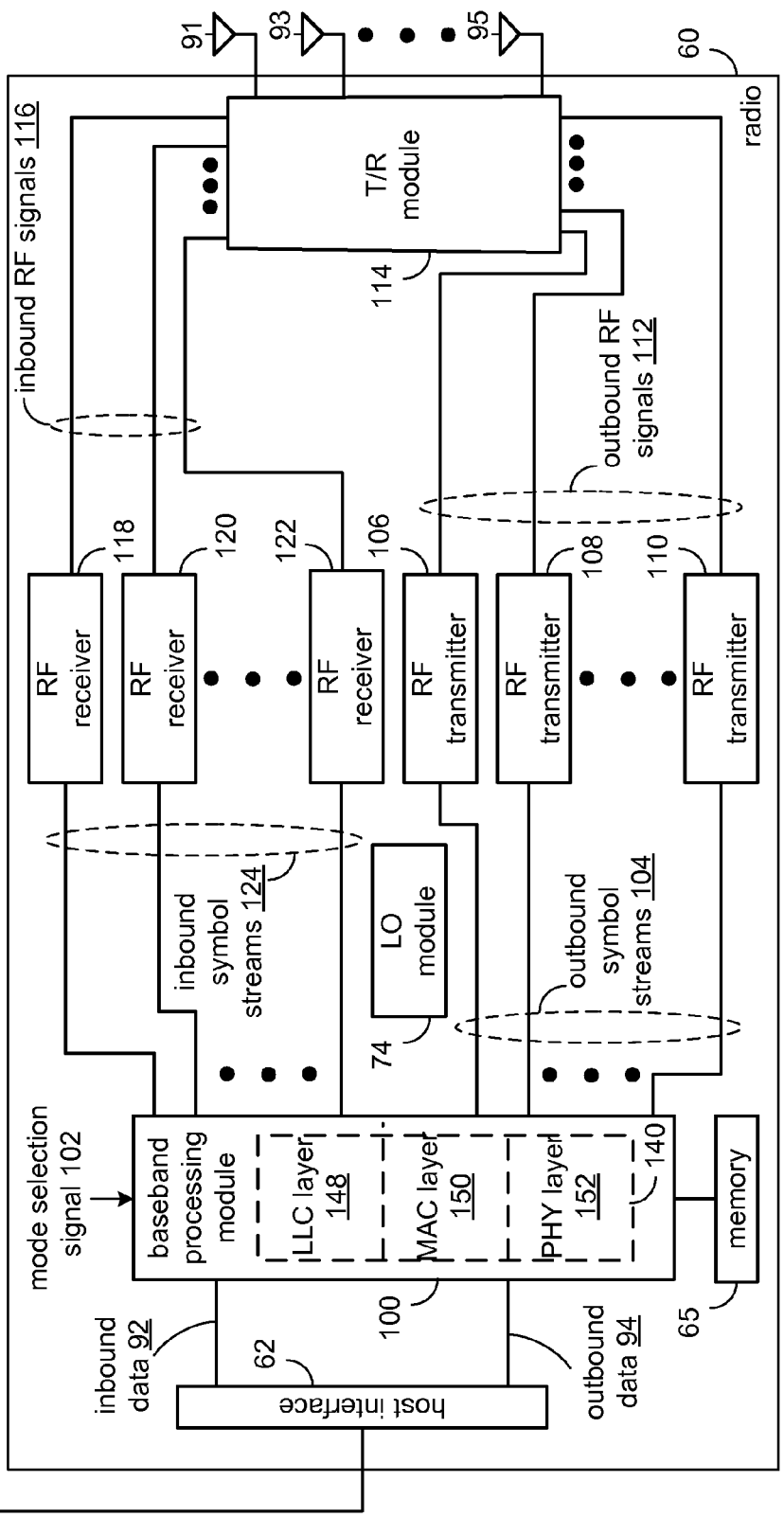

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (for example, inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency ("RF") transmitters 106-110, a transmit/receive ("T/R") module 114, a plurality of antennas 91-95, a plurality of RF receivers 118-120, and a local oscillation module 74. The baseband processing module 100, in combination with operational instructions stored in memory 65, executes digital receiver functions and digital transmitter functions, respectively.

The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion.

The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The baseband processing module 100, in combination with operational instructions stored in the memory 65, implement a protocol stack 140, which is generally based upon the Open Systems Interconnection ("OSI") model. The protocol stack 140 includes the logical link control ("LLC") layer 148 and the medium access control ("MAC") layer 150, and a physical ("PHY") layer 152. Through the MAC layer 150 and the PHY layer 152, the radio 60 can receive frames at reduced interframe spacing ("RIFS") intervals that increases the data transfer rate to the receiver. Implementing RIFS through the interaction of the signaling/frames 151 of the MAC layer 150 and the PHY layer 152 will be discussed in detail with reference to FIGS. 4 through 11.

In general, under a RIFS receive mode of operation, the radio 60 realizes increased efficiency of frame and/or fragment transfer and processing by sustaining the receiver setup of the PHY layer 152 for subsequent frames, and front-end and back-end processes to provide at least partial parallel processing of the received frames, as will be discussed in detail with respect to FIGS. 4 through 11.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal 102 will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier ("NBPSC"), coded bits per OFDM symbol ("NCBPS"), and/or data bits per OFDM symbol ("NDBPS"). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102, produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates two, three, or four antennas, the baseband processing module 100 will produce two, three, or four outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 91-95.

When the radio 60 is in a receive mode (non-RIFS or RIFS), the transmit/receive module 114 receives one or more inbound radio frequency ("RF") signals 116 via the antennas 91-95 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of ordinary skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 91-95, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
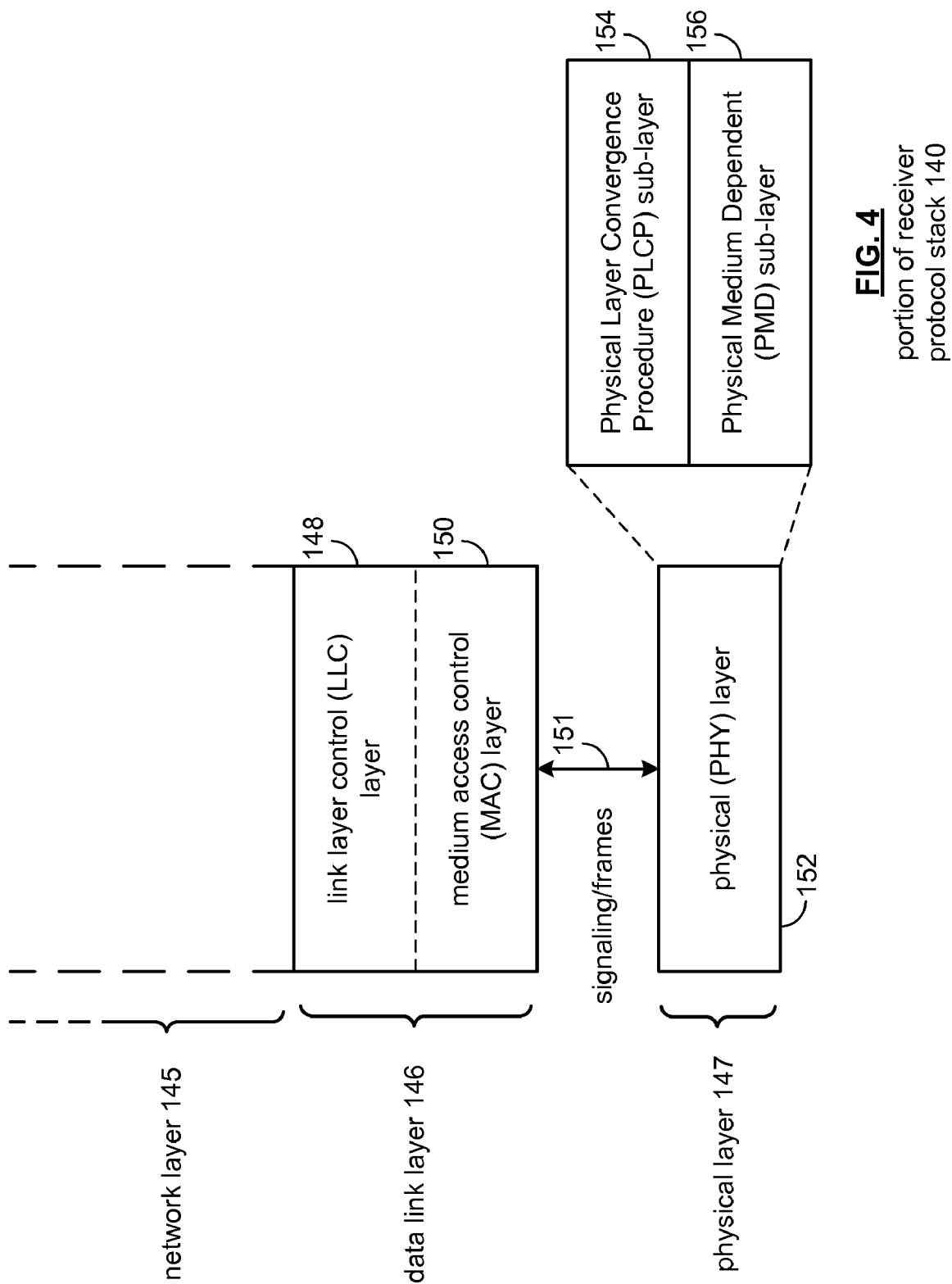
FIG. 4 illustrates a portion of a protocol stack deployed in a receiver according to an embodiment of the present invention.

FIG. 4 illustrates a portion of a protocol stack 140, which is based upon the OSI model, and implemented in the radio 60 via the digital receiver processing module 64 and digital transmitter processing module 76 (see FIG. 2) and/or the baseband processing module 100 (see FIG. 3). In general, the protocol stack 140 includes protocol layers, each with a defined set of functions and operations. With a protocol stack implementation, the present embodiment increases the data throughput via receiving frames in a RIFS receive mode by suppressing acknowledgment of the received frames by the receiver, by minimizing the tear-down of the receiver setup of the PHY layer 152, and by providing front-end and back-end processing of the received frames having a reduced interframe spacing interval.

The protocol stack 140 includes a physical layer 147, a data link layer 146, and a network layer 145. Additional layers, such as the transport layer and the application layer, are included above the network layer as indicated by the dashed lines, but for the sake of clarity they are not discussed further herein. The physical layer 147 includes a physical ("PHY") layer 152 having a Physical Layer Convergence Procedure ("PLCP") sub-layer 154 and a Physical Medium Dependent ("PMD") sub-layer 156. The PHY layer 152 may be referred to in the general sense, but is to be understood to include the PLCP sub-layer 154 and the PMD sub-layer 156. The data link layer includes a link layer control ("LLC") layer 148 and a medium access control ("MAC") layer 150. The interaction between the MAC layer 150 and the PHY layer 152, via the signaling/frames 151 communications, provide the receiver of the radio 60 with the ability to receive frames under a RIFS receive mode.

The PHY layer 152 provides wireless receiving functions (for example, descrambling, decoding, deinterleaving, symbol demapping and demodulation, et cetera) for the MAC layer 150, in accordance with the control and/or configuration signals via signaling/frames 151. The PHY layer 152 also supports secondary functions such as assessing the state of the wireless channel and reporting this status to the MAC layer 150. The PLCP sub-layer 154 is, in effect, a handshaking layer that enables MAC protocol data units (MPDUs) to be transferred (via data octets) between MAC layer 150 and the PMD sub-layer 156, which provides a wireless reception service function (to receive inbound digital signals, or a raw bit stream, from the radio front end circuitry) that is interfaced to the MAC layer 150 via the PLCP sub-layer 154. As one of ordinary skill in the art may appreciate, the PLCP and PMD sub-layers may vary based upon specific wireless LAN specifications.

The PHY layer 152, via the PLCP sub-layer 154, indicates to the MAC layer 150 when transmission reception begins from a source station (for example, via carrier sensing), and when transmission reception is complete. Through the PLCP sub-layer 154, the MAC layer 150 can reset, or tear down, the receiver setup of the PHY layer 152. The MAC layer 150 operations also include, without limitation, station connectivity regarding the selection and communication with other stations, including access points, and wireless LAN frame formats. The MAC layer 150 functions include channel allocation procedures, protocol data unit ("PDU") addressing, frame formatting, error checking, and fragmentation and reassembly.

The LLC layer 148 operates to provide a standard interface and signal format and protocol between the various kinds of 802 networks to the network layer 145. This format, interface, and protocol are based upon the high-level data link control ("HDLC") protocol. The LLC layer 148 forms the upper portion of the data link layer 146. In operation, the network layer 145 uses LLC access primitives to pass a packet to the LLC layer 148. The LLC layer 148 adds an LLC header, containing sequence and acknowledgement numbers, which is passed to the MAC layer 150.

The MAC layer 150 and the PHY layer 152 may be implemented by a digital transmitter processing module 76 and operational instructions stored in a memory 75 (see FIG. 2) and/or in a baseband processing module 100 (see FIG. 3). The processing modules 76 and 100 may be implemented in logic, in operation instructions via software, or a combination of technologies to accommodate critical timing, non-critical timing, and/or response requirements of the MAC layer 150 and the PHY layer 152, as well as those of the radio 60 in general.

As an example, timing-critical requirements for the MAC layer 150 include those functions demanding fast responses or precision timing, such as cyclical redundancy code ("CRC") generation and checking, hardware-level frame retry, channel access, timer updates, and generation of special frames such as beacons, ACK (acknowledgment), CTS (clear-to-send), et cetera. With respect to the MAC layer 150, software operational instructions may prompt the processing module (such as receiver processing module 64 and/or baseband processing module 100) to support non-timing critical functions. Examples of non-timing critical requirements, within the MAC layer 150, include functions such as complex frame exchanges (for example, authentication and association exchanges), fragmentation, frame buffering and bridging, et cetera. Accordingly, the layers may be implemented as a combination of logic and memory storage configured to carry out the task of the layer (that is, while data is in the digital domain).

The functional logic may be hardware, software, firmware, or a combination thereof, implemented using application specific integrated circuits ("ASIC") or systems-on-chips (where variations may include gate array ASIC design, full-custom ASIC design, structured ASIC design, et cetera), application specific standard products ("ASSP"), programmable gate array ("PGA") technologies (such as system programmable gate arrays ("SPGA"), field programmable gate arrays ("FPGA")), et cetera. Also, each layer, or a combination of all or portions of the layers, may be implemented as an integrated circuit or software program (including drivers) to accommodate timing and/or processing requirements, providing for RIFS receive mode operation as well as other operational modes that are non-RIFS, such as those wireless communications specifications providing a distributed coordinated function and point coordinated function operations.

Figure 5:
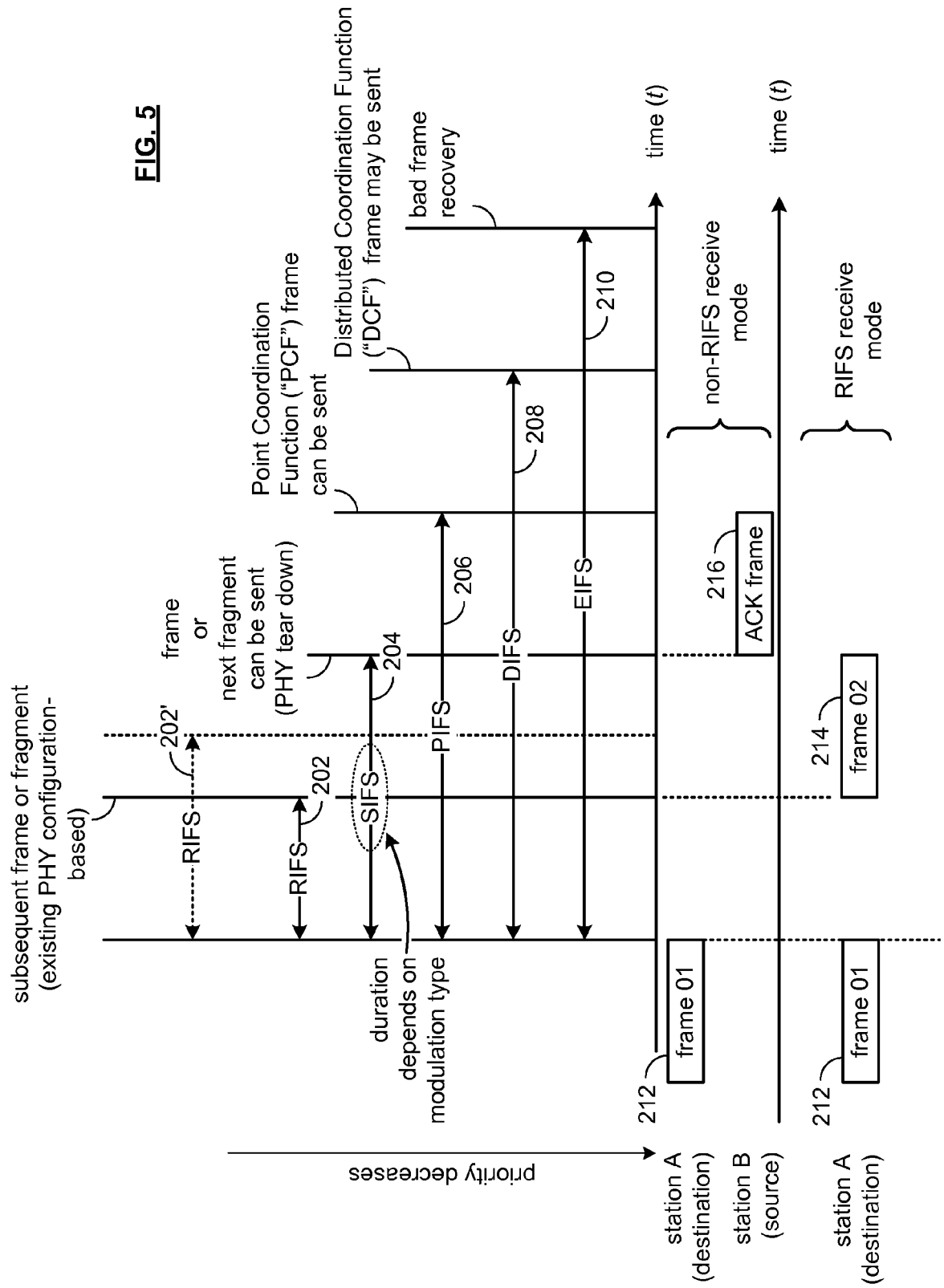
FIG. 5 illustrates a method for receiving a plurality of frames at a reduced interframe spacing ("RIFS") according to an embodiment of the present invention.

FIG. 5 illustrates a method for receiving frames and/or fragments under a reduced interframe spacing ("RIFS") interval 202 in comparison to interframe spacing ("IFS") intervals 204 through 210 under the IEEE 802.11 wireless LAN specifications according to one embodiment of the invention. The actual timing between the spaces may vary, such as with respect to modulation type and permitted tolerances under applicable specifications. In one embodiment, a receiver is operable to detect these spacings to determine whether a transmitter is generating frames with reduced interframe spacing and to therefore operate in a RIFS receive mode or a non-RIFS receive mode of operation.

In a network where multiple devices may seek access to a base station/access point (or to another device not serving as a base station/access point, MAC layer priority schemes provide coordinated access to physical resources. Generally, one priority scheme is based at least partially upon interframe spacings (or time intervals) following the end of transmission for a frame within a basic service set ("BSS") network.

Under 802.11 wireless LAN specifications, for example, transceivers support Point Coordination Function ("PCF") operations (such as where a base station or access point provides central control in a service area, such as service area 04, 06, and/or 08) and Distributed Coordination Function ("DCF") operations. The PCF operation relies on the access point to perform polling operations to enable the polled stations to transmit without contending for the wireless channel. The DCF operation is the fundamental access technique for supporting asynchronous data transfer on a best-effort basis, and operates in a distributed manner, without requiring centralized control. Additional priority schemes examples defined within the 802.11 specification include the Hybrid Coordination Function (HCF) Controlled Channel Access ("HCCA") mechanism which relies on the access point to perform polling operations based upon exchanged flow descriptions to enable polled stations to transmit without contending for the wireless channel and the Enhanced Distributed Channel Access ("EDCA") mechanism, which operates in a distributed manner, without requiring centralized control. Under the IEEE 802.11 specification, the PCF operation and the DCF operation and HCCA and EDCA operation can coexist.

In discussion of the differences of the non-RIFS receive mode and the RIFS receive mode, the IFS intervals depicted in FIG. 5 with respect to frame 212 and acknowledgement frame 216 distinguish the reduced IFS interval associated with the RIFS receive mode with respect to a frame 212 and a subsequent frame 214.

Under a non-RIFS receive mode of operation, (for example, under IEEE 802.11 specifications), four intervals are defined: The SIFS 204 is the shortest interval, followed by the Point Coordination Function IFS ("PIFS") interval 206, and the Distributed Coordination Function IFS ("DIFS") interval 208. Access to the wireless channel is effectively prioritized through the use of these various interframe space ("IFS") intervals between the received frames. Under the specification, the IFS intervals are mandatory periods of idle time on the wireless channel. Generally, after a frame 212 is sent (that is, there is data-on-the-air), a certain amount of idle time is required before any station may send a frame. Under the non-RIFS receive mode, stations that are only required to wait a SIFS interval 204 have priority access over those other stations required to wait a PIFS interval 206 or a DIFS interval 208. That is, exactly one station is entitled to respond to the frame 212 with a frame or a frame fragment following the SIFS interval 204. The frame or fragment in this example is the Acknowledgment ("ACK") frame 216. Because the SIFS interval precedes the ACK transmission, the ACK frame transmission has priority over other transmissions that would use PIFS- or DIFS-sized interframe spacing intervals.

Following the SIFS interval 204, the receiver setup established in the PHY layer (that relates to the frame 212) is "torn down" or reinitialized. If station A fails to respond and the next larger interval, the PIFS interval 206, elapses, the base station or access point, such as access points 12, 14, and/or 16 (see FIG. 1), may send a beacon frame or a poll frame. The beacon frame of the poll frame allows a station sending a data frame or fragment sequence to finish its frame without other stations interfering, but gives the access point an opportunity to acquire the wireless channel when the previous sending station is done without competing with other stations.

When an access point remains silent, however, and the next larger DIFS interval 208 elapses, any station (for example, wireless communication devices 26, 28, 30, and/or 32 of FIG. 1) may attempt to acquire the channel to send a new frame.

The last time interval, the EIFS (Extended InterFrame Spacing) interval 210, is used by a station that has received a bad or unknown frame. This event produces the lowest priority of access since the destination station is likely to have lost its ability to determine the state of the wireless channel with respect to the transmissions of other devices. Accordingly, the device needs to wait a substantial amount of time to avoid interfering with a potentially ongoing dialog between two other stations.

While the above standards specification-based protocol satisfies its goals of coordinating communications, there are some aspects that may be improved upon to correspondingly improve network efficiencies.

In a second, or RIFS, receive mode of operation, increased frame throughput and overhead reduction is realized by reducing handshake protocols in frame reception (such as suppressing frame acknowledgments), minimizing setup/teardown of the receiver setup, and reducing the idle time following frame transmission with reduced interframe spacing intervals.

Reducing the handshake protocols in the RIFS receive mode involves suppressing acknowledgment frames in response to a received frame. That is, the acknowledgment frames are suppressed from the frame/response acknowledgment pattern; however, for receipt confirmation, the receiving device may delay the acknowledgement frames as well as provide a block acknowledgment to the transmitting device. In the alternative, the transmitting device may indicate that the receiving device is to not send acknowledgement frames altogether. Foregoing or delaying the preparation and transmission of the acknowledgment frame allows a destination station to focus resources upon the reception of frames at an increased rate. In this regard, the receiver, when in the RIFS receive mode, does not immediately (such as via a handshake confirmation) provide reception acknowledgment to a source station that transmits a frame that includes data.

Also improving data throughput in a RIFS receive mode is the minimization of the receiver setup/teardown in the PHY layer for each received frame by sustaining the receiver setup for a preceding received frame 212, and using the existing receiver setup for processing the subsequent frame 214, and for other subsequent frames for the duration of the transmission. As channel conditions may slightly vary for the duration of the transmission, the receiver setup may be finely adjusted to accommodate these variations, while still minimizing the resources associated with complete setup/tear-down cycles associated with wireless communication specifications and/or protocols (such as 802.11a, 802.11b, 802.11g, Bluetooth, et cetera).

Also, the frames are transmitted and received within a reduced interframe spacing, which reduces the idle time otherwise associated with the non-RIFS receive mode SIFS interval 204. Because the duration of the SIFS interval 204 is modulation dependent (where modulation includes, for example, Complementary Code Keying ("CCK") or Orthogonal Frequency Division Multiplexing ("OFDM")), a RIFS interval 202 is similarly adjustable to be less than a given SIFS interval. For example, when the modulation type for a frame is CCK, the RIFS interval 202 can be in a range from about 0 to about 8 microseconds. When the modulation type is OFDM, the RIFS interval 202' can be in a range from about 0 to about 14 microseconds. Also, other IFS interval durations (such as PIFS, DIFS interframe spacing interval durations) are also modulation dependent.

Instances where the RIFS receive mode may not be suitable for use is under adverse transmission conditions where coarse radio receiver settings may not be sustainable, such as when transmission power levels change. Another instance may be when the MAC layer of a transmitting or source station (station B) will require an immediate, or prompt, response from the destination station (for example, an acknowledgment ACK frame 216) such as when a suppressed acknowledgment response is unsuitable (for example, when a maximum acceptable frame delivery latency may be exceeded when the RIFS receive mode is used). A further instance is where the number of frames transferred between the destination station and the source station exceed a predetermined number—for example, providing a larger IFS (such as a Short IFS interval, as compared to a RIFS interval) allows other devices (that are not in RIFS receive mode) in a BSS or not part of the BSS to understand that communications are ongoing between stations, as well as to provide the opportunity for other devices to respond, if necessary. That is, devices not able to receive frames that are spaced at less than an SIFS interval would likely have a compromised ability to maintain or establish a correct understanding of the medium state during RIFS-separated transmissions, particularly when they are in a sleep state at the beginning of a RIFS-separated transmission sequence and revert to the awake state sometime during the RIFS-separated transmission sequence.

Figure 6:
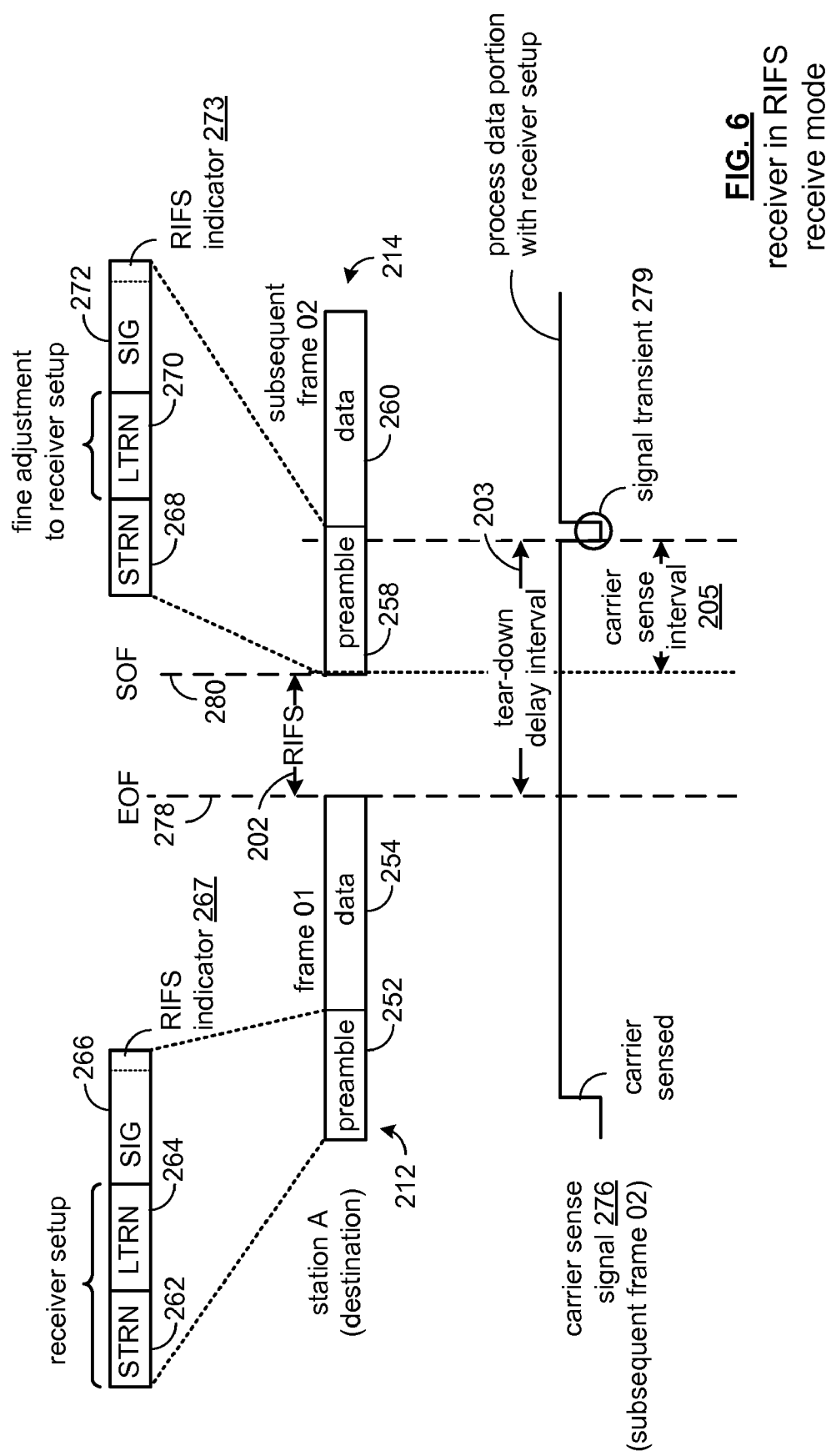
FIG. 6 is a signal diagram illustrating a receiver of a wireless communication device in a RIFS receive mode according to an embodiment of the invention.

FIG. 6 is a signal diagram illustrating a receiver in a RIFS receive mode of operation. Station A, which is a destination station, is operable to receive and process a frame 212 that is being transmitted as one of a plurality of frames that includes a header or preamble portion, and a data portion. The frame 212 includes a preamble 252 and data 254. The preamble 252 includes a short training sequence 262, a long training sequence 264, and a signal field 266.

Generally, the preamble training sequences contain specified training symbols, in accordance with one or more standards specifications, to provide for estimation of the wireless communication channel. The preamble provides sufficient information for packet detection, frequency offset estimation, symbol timing, and channel estimation. Furthermore, in Wireless LANs, for example, the preamble training sequence is added to data packets prior to transmission. As part of the synchronization processes, the preamble training sequences have short training symbols STRN, long training symbols LTRN, and a signal field.

The short training symbols STRN (generally about 10 periods of 0.8 microseconds duration each in one embodiment of the invention), are used to detect the start-of-frame, gain control sequence, carrier frequency offset, symbol recovery, etc. The long training symbol LTRN (for example, in OFDM techniques, generally having 2 periods of a training symbol, each being four microseconds in duration) provide information for channel estimation and fine improvements to receiver performance. The signal field 266 contains information specifying the data configuration and length-related parameters for the processing the data portion.

The receiver may enter into an RIFS mode under either explicit or implicit determinations. Under explicit determinations, the signal field 266 of preamble portion 252 includes, in one embodiment of the invention, a RIFS indicator 267 for indicating that the transmitted frame and subsequent frames being received by the receiver are being transmitted in a RIFS receive mode having a reduced interframe spacing. Although the RIFS indicator 267 is described as being a bit field within the preamble 252, the RIFS indicator 267 may also be provided via a modulation indicator associated with the frame 212, or other suitable form of indicator.

Under implicit determinations, station A may enter an RIFS receive mode by discerning or observing the frames being received, and also by observing the channel to discern which transmitting source station has RIFS receive mode capability. For example, with respect observing the frames, whether there is a RIFS interval 202 separating the received subsequent frame 214 and the received frame 212 may be determined when the carrier sense signal 276 for the subsequent frame 214 indicates that a carrier is sensed during the tear-down interval 203. Because a carrier is sensed prior to the passage of a SIFS interval and before expiration of the tear-down delay interval 203, then the frames are being transmitted in a RIFS receive mode. The process continues with subsequent frames through the end of the plurality of frames, or frame fragments.

That is, when a frame does not arrive within an RIFS interval, the receiver resets after some predetermined time, or may be forced into a reset via an action of the MAC layer (for example, when the MAC layer of the receiver decides to send an acknowledgement frame—MAC layer decision is usually communicated to the PHY layer 152 as a command to initiate a transmission, but can also be signaled separately from the indication to initiate a transmission).

Communication between the MAC layer 150 and the PHY layer 152 is provided by signaling/frames 151 (see FIG. 4), which include a carrier sense signal that corresponds to a received frame. For example, the carrier sense signal 276 corresponds to the received frame 212 and the received subsequent frame 214. The carrier sense signal 276 indicates, through the signal transient 279, that the station is receiving the subsequent frame 02 within the RIFS interval 202. Through these signals, the receiver either sustains the receiver setup that relates to the preceding received frame 212 or tears-down the receiver setup based upon either a logic state of the RIFS indicator 267 (or duration of a spacing interval corresponding to 802.11 defined spacing intervals). The duration of the delay 203 may be indicated, for example, via a signal passed from the PHY layer 152 to MAC layer 150 via the carrier sense signal (such as the carrier sense signal 276).

As the frame 212 is received, the carrier sense signal 276 indicates the sensing of the carrier for the received frame 212, and the receiver setup relating to the received frame 212 occurs with the preamble 252 and the short training symbols 262 to provide a coarse receiver setup setting and the long training symbols 264 to provide a fine receiver setup.

Following the end-of-frame ("EOF") 278 for the frame 212, the radio 60 delays tear down of, or otherwise sustains, the receiver setup for a tear-down delay interval 203. For the tear-down delay interval 203, the PHY layer 152 introduces a delay to the carrier sense signal 276 (that is, the PHY layer 152 dictates to the MAC layer 150, through the Carrier Sense/Clear Channel Assessment ("CS/CCA") functionality, whether the channel medium is busy or idle—for example, whether the receiver is receiving a frame via the Carrier Sense and whether the channel is idle), in which case the delay carries over from the end of a frame reception. The duration of the tear-down delay interval 203 is larger than the RIFS interval duration, permitting the station A the opportunity to sense a subsequent frame over the wireless channel.

Following expiration of a tear-down delay interval 203, the PHY layer 152 either asserts and leave the carrier sense signal asserted (that is, drop the carrier sense signal 276 when no subsequent RIFS frame is detected, or asserts and drops the carrier sense signal (that is, lower and raise the carrier sense signal 276 as indicated by the signal transient 279), which demarks to the MAC layer 150 an end of the previous frame (such as for frame 01) and to process the RIFS-spaced subsequent frame 02.

When a subsequent frame is a non-RIFS frame, the PHY layer 152 passes information to the MAC layer 150, which delineates the individual boundaries of the frame and a timing mark for spacing interval timing. In this manner, the receiver may process frames in an RIFS and non-RIFS receive mode.

In general, under the RIFS receive mode, the radio 60 may use the receiver setup again for subsequent frames because the wireless channel effects on subsequently received frames, such as the subsequent frame 214, are similar to those on the frame 212.

Under an RIFS receive mode, the radio 60 presumes the same source station is transmitting the subsequent frame, and that the same variables specific to that transmitting source station apply. Accordingly, the receiver setup for frame 212 is generally applicable to a subsequent received frame. The radio 60 delays the tear-down of the radio setup in the PHY layer 152 over a tear-down delay interval 203 by holding the carrier sense signal 276 at a logic high state past the EOF 278, over the RIFS interval 202, and over the start-of-frame 280 into a portion of the subsequent frame 214. The tear-down delay interval 203 has a length sufficient to accommodate the RIFS interval 202 and the carrier sense interval 205 for subsequent frames or fragments. Also, the tear-down delay interval is less than a SIFS interval 204, as is discussed in detail with reference to FIG. 7.

In operation, as the EOF 278 arises for frame 212, the receiver, via a MAC layer 150 in cooperation with the PHY layer 152, senses for a carrier of the received subsequent frame 214 while sustaining the receiver setup over the predetermined delay interval of the tear-down delay interval 203. The tear-down delay interval 203 and the carrier sense interval 205 are proportional to the duration of the RIFS interval 202. That is, when the RIFS interval 202 duration is reduced or enlarged (but remaining less than the duration of a SIFS interval 204), these intervals also adjust to allow the destination station to process subsequent frames in a timely fashion.

When a carrier is sensed following the duration of the carrier sense interval 205, the receiver processes the received subsequent frame 214 with the receiver setup. When a carrier is not sensed over the carrier sense interval 205 (for example, when all of the plurality of frames had been received, when a subsequently received frame had become distorted and/or corrupted over the wireless channel, when the frame was lost in transit over the wireless channel, et cetera), then the destination station A tears-down the receiver setup and exits the RIFS mode of operation, entering a normal receive mode of operation.

Upon sensing the carrier for the subsequent frame, the destination station processes the preamble 258, which includes a short training sequence 268, a long training sequence 270, and a signal field 272. Because of the shorter period of idle time between the frame 212 and the subsequent frame 214, the channel characteristics associated with the subsequent frame 214 appear similar to those the frame 212, the majority of the receiver setup has already been completed in the receiver setup overhead for the frame 212 (such as coarse adjustment for frequency offset, etc.). The PHY layer 152, or receiver setup, does not need to be torn down with each of the frame of a RIFS transmission, although further refinement in the receiver setup may occur by fine adjustment to the receiver setup (including channel estimation and fine frequency acquisition) via the long training symbols 270.

Figure 7:
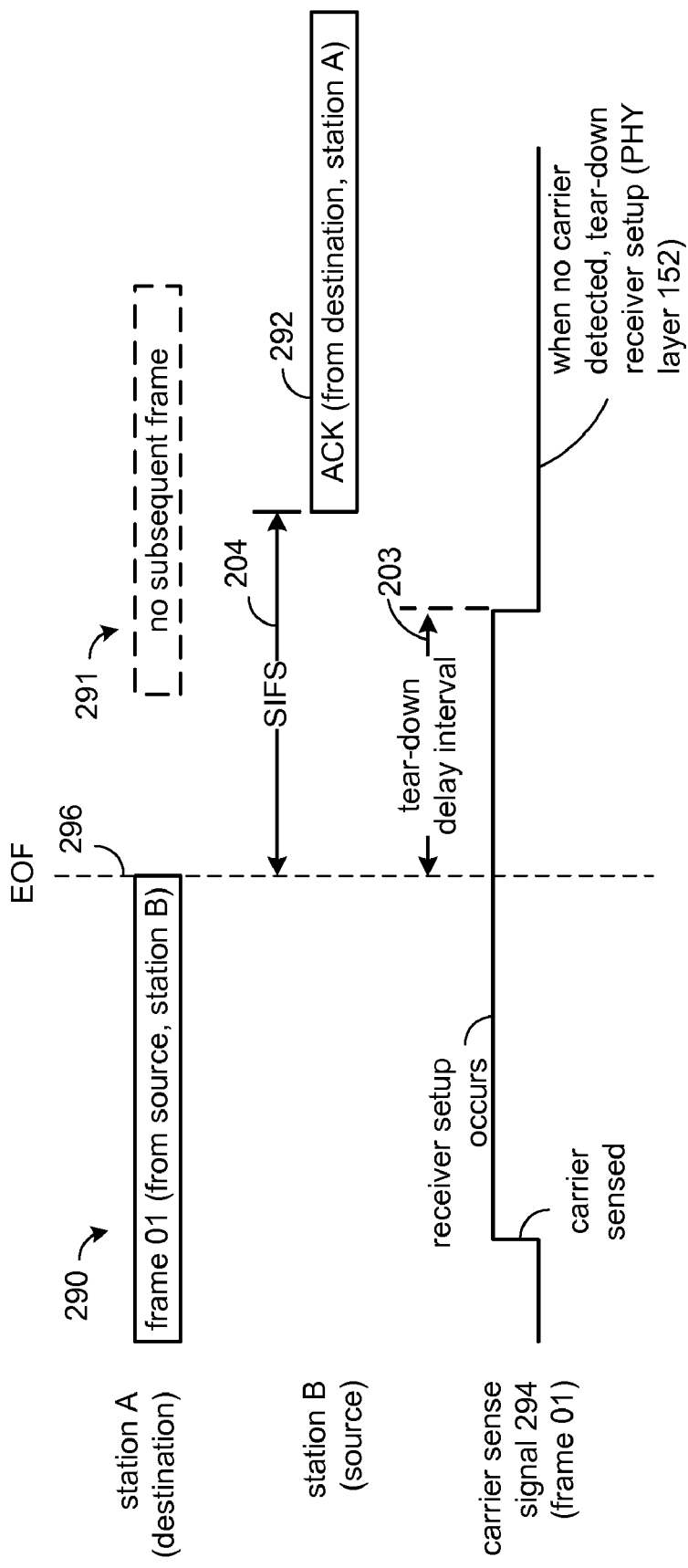
FIG. 7 is a signal diagram illustrating a receiver of a wireless communication device in a non-RIFS receive mode according to an embodiment of the invention.

FIG. 7 is a signal diagram illustrating a receiver operating in a non-RIFS receive mode according to one embodiment of the invention. In this mode, acknowledgements are provided from the destination station to the source station in response to frames (or frame fragments), and the receiver set up is torn down following an interframe spacing interval, which in this instance is the SIFS interval 204, and is generated according to IEEE 802.11 specification or other defined specifications.

The station and (or destination station) receives a frame 290 and following the SIFS interval 204 duration, responds with an acknowledgement frame 292. Following sensing of the carrier of frame 290 in the PHY layer 152, as indicated by the carrier sense signal 294, the destination station, station A, establishes a receiver setup based upon the training sequences contained within a preamble for the received frame.

Because a subsequent frame was not received within the tear-down delay interval during an RIFS interval, a SIFS interval 204 follows the end of frame ("EOF") 296 of frame 290. As shown, the tear-down interval 203 is less than the SIFS interval 204. Accordingly, as no subsequent frame (as indicated by the dashed lines 291) was received before the tear-down interval 203 lapses, the destination station A in response tears down the receiver setup based upon the carrier sense signal 294 (and when in an RIFS mode of operation, resumes a normal receive mode of operation). Station A then generates and sends an acknowledgment frame 292, according to wireless LAN specifications, to the source station.

Alternatively, the MAC layer may initiate the transmission of the ACK frame response by signaling the PHY layer before the tear-down delay has ended. This transmission initiation forces an abrupt end to the tear-down delay. This situation only applies as an alternative if the MAC makes such a decision to transmit, but even then, the tear down delay may have completed before the MAC initiates the subsequent transmission. The exact timing depends on the implementation variables as well as the relative values for tear-down delay versus the appropriate SIFS time for a given modulation.

Figure 8:
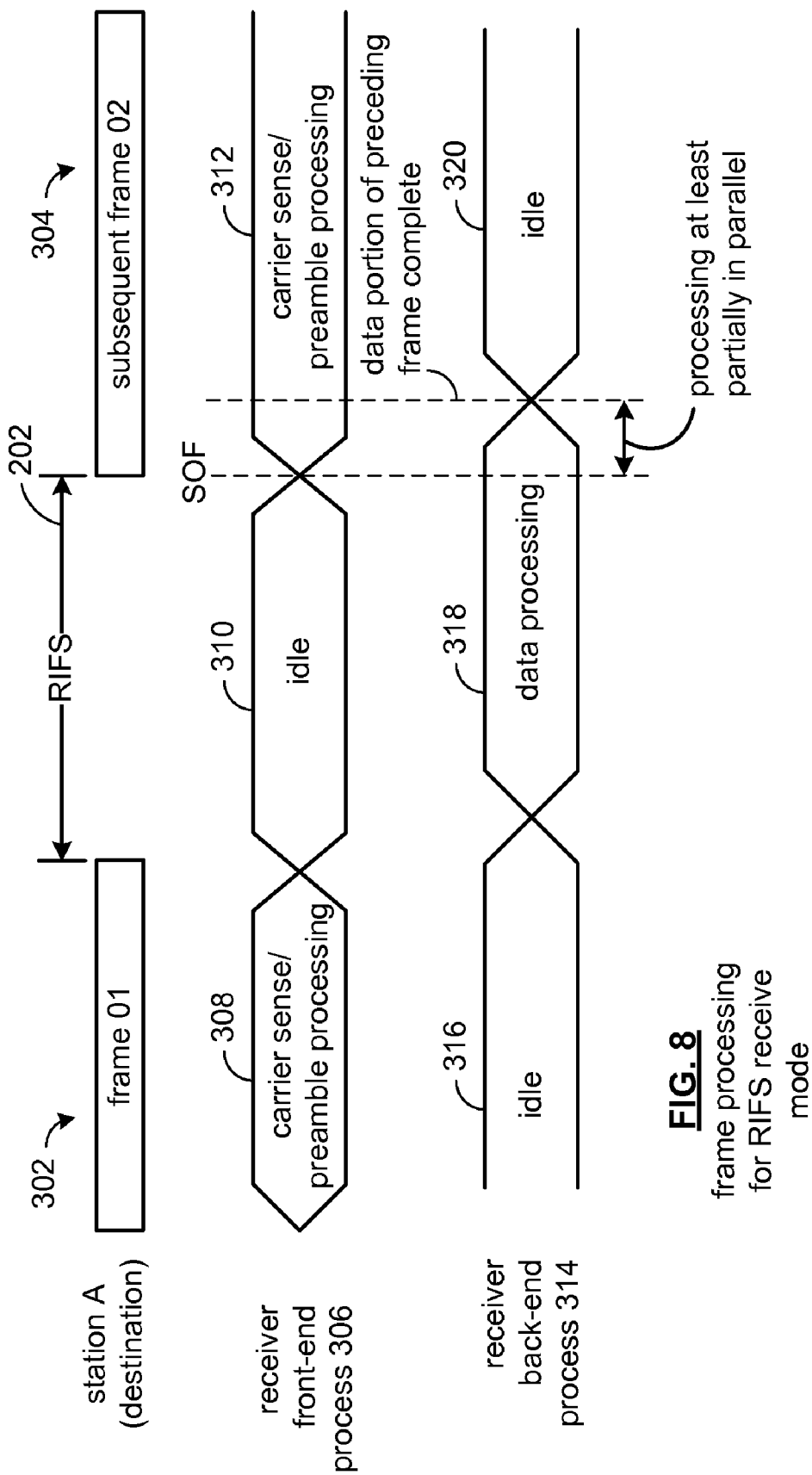
FIG. 8 is a timing diagram illustrating front-end and back-end processes of a receiver for processing a plurality of frames in a RIFS receive mode according to an embodiment of the invention.

FIG. 8 is a timing diagram illustrating a front-end process 306 and a back-end process 314 of a destination station. The destination station may multitask the front-end process 306 and the back-end process 314, in which a processing module executes or provides resources to process, at least partially in parallel, portions of received frames. Examples of multitasking include cooperative multitasking, time-slice multitasking, et cetera. Also, the destination station may provide multiple processing modules capable of processing the received frames simultaneously in the front-end process 306 and the back-end process 314.

In general, if a plurality of frames is provided to a destination receiver in a sequential manner under a reduced interframe spacing, the frames and/or fragments may be received at a rate greater than the processing capability of the destination station. To accommodate the increased frame rate, the frames may be processed in manner that occurs, at least partially, in parallel. The structure of the frames are similar in that they have a preamble or header portion, and a data portion. For increased processing rates, a receiver front-end process 306 processes the preamble portion, including carrier sensing and preamble processing (such as receiver setup, signal field decoding for processing the data portion), and back-end process 314 to carry our processing of the data portion.

Receiving a frame includes carrier detection, receiver setup, and processing of the frame data portion. To increase the processing rate of the receiver, a back-end process 314 processes the data portion of a preceding frame while a front-end process 306 processes the preamble portion of subsequent (that is, subsequently received) frames. In this manner, the processing capacity of the destination station A accommodates the increased frame rate due to use of a RIFS interval as contrasted to conventional 802.11 spacing intervals.

In operation, the destination station A receives the frame 302, and the receiver front-end process 306, in state 308, processes the preamble of frame 302 including carrier sensing and receiver setup. The front-end process 306 may also provide decoding of the signal field, which includes information relating to decoding of the data portion of frame 302. While the preamble portion is being processed by the receiver front-end process 306, the back-end process 314 is in an idle state 316 until the front-end process 306 passes data processing to the back-end process. When the preamble portion is processed, the front-end process passes into an idle state 310. With multiprocessing, where a single processing module resources are being use, the process passes into the idle state; however, if multiple processing modules are implemented, then the processing module for the front-end process passes into an idle state and the back-end process passes into state 318 for processing of the data portion of the frame 302.

While the data portion of frame 302 is processed by the back-end process state 318, the destination station A receives a subsequent frame 304. The receiver front-end process transitions from the idle state 310 to a state 312 for carrier sensing and preamble processing for the subsequent frame 304. While the subsequent frame 304 is being received, the data processing state 318 continues to process the data portion of the preceding frame 302. In this manner, data processing and preamble processing functions occur at least partially in parallel, thus accommodating the increased frame rate due to the reduced interframe spacing. As the frames continue to be received, the receiver front-end process 306 and the receiver back-end process 314 are engaged to process the respective portions of the received frames. Because the receiver setup for the plurality of frames is substantially established in state 308, processing of the subsequent frames in the front-end process 306 is further reduced; however, fine adjustment to the receiver setup, via processing the long training symbols, may be performed to refine subsequent processing of a subsequent frame. That is, minimized processing by the front-end process 306 is used because the coarse receiver setup will still be applicable to the subsequent frame 304. That is, the channel characteristics associated with the subsequent frame 304 will be similar to those of the preceding frame 302. The similarity is bolstered by a reduced IFS interval 202 (that is, reducing the time interval over which variations may occur), the elimination of an acknowledgement frame response by the destination station A, and the presumption that subsequent frames are transmitted by the same source station (that is, the individual source station transmission nuances remain substantially the same). The front-end process 306 for subsequently received frames and/or fragments, accordingly, relates to fine adjustment of the receiver setup via the appropriate preamble training symbols.

Figure 9:
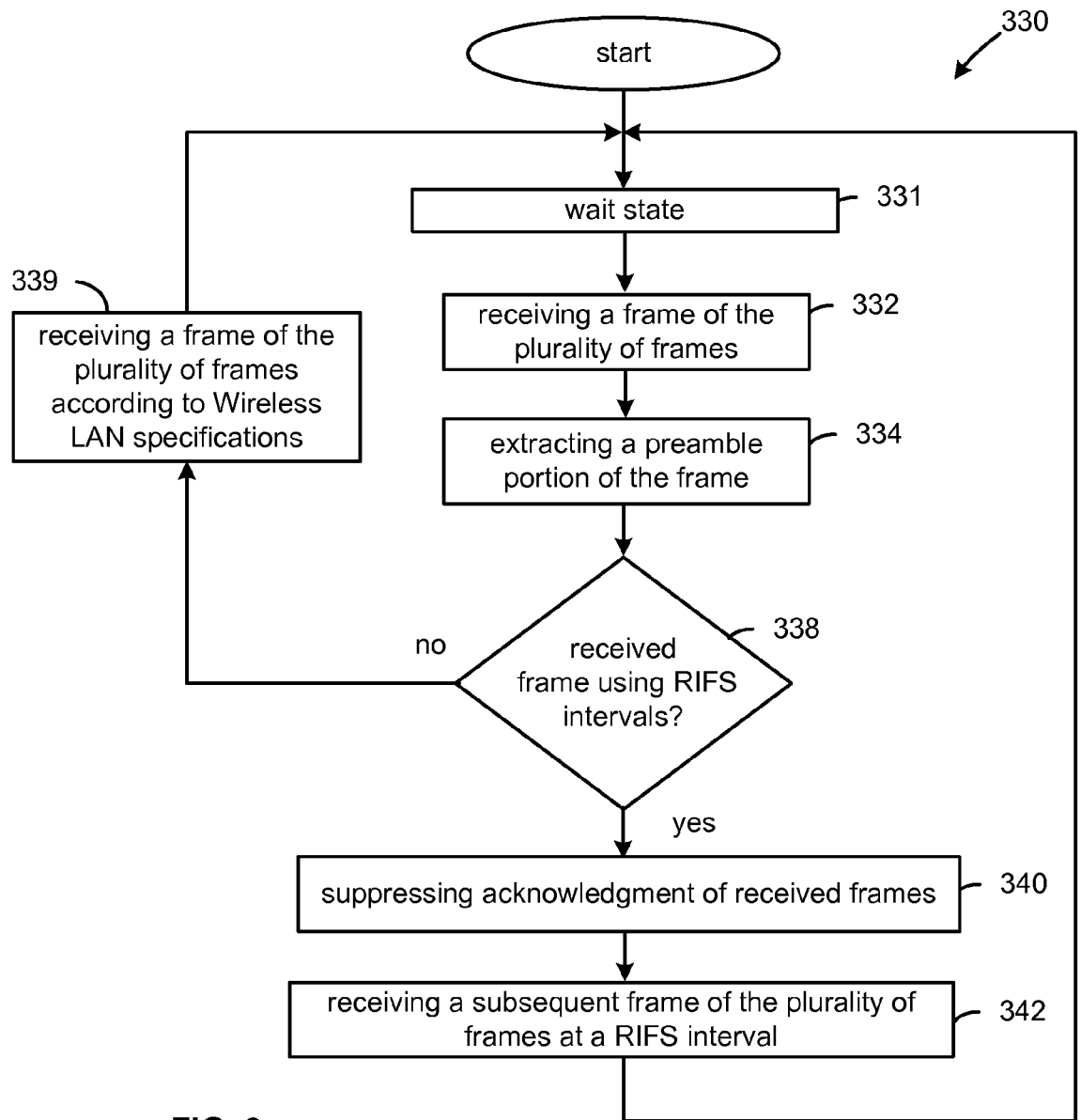
FIG. 9 is a flow diagram illustrating a method for receiving a plurality of frames in a wireless Local Area Network ("LAN") in a RIFS receive mode according to an embodiment of the invention.

FIG. 9 is a flow diagram illustrating a method 330 performed by a receiver in a Wireless Local Area Network ("LAN") for receiving a plurality of frames according to one embodiment of the invention. Each of the frames includes a preamble portion and a data portion. The receiver enters into a RIFS receive mode based upon a RIFS indicator within a received frame.

At step 331, a destination station is in a wait state "listening" for frames and/or fragments. The destination station leaves the wait state to receive a frame of a plurality of frames at step 332. With receiving the frame, the receiver extracts the preamble portion at step 334, and further processes, as necessary, the received frame to access the appropriate short and long training symbols for carrier sensing and receiver setup. From the preamble, the receiver determines whether the received frame is using a Reduced InterFrame Spacing ("RIFS") at step 338. The RIFS indicator may be a bit field within the preamble, a characteristic of the preamble such as an inverted modulation type, may be discerned as being in an RIFS receive mode by monitoring the frames, as well as presumed to be within an RIFS receive mode, et cetera.

When the received frame is not being transmitted using RIFS intervals, the destination receives, and processes, the plurality of frames at step 339 according to the protocols and interframe spacings in accordance with a particular wireless communication standard or protocol (for example, IEEE 802.11a, IEEE 802.11b, 802.11g, Bluetooth, etc.). Following processing of the plurality of frames in a PCF or DCF operation, depending upon the basic service set of the network, the destination station returns to the wait state 331.

When the received frame includes a reduced interframe spacing indicator, at step 340 the destination station suppresses acknowledgment of received frames from the plurality of frames. Acknowledgment suppression reduces processing and resource overhead and allows the destination station to direct receiver resources to increased frame throughput tasks. Acknowledgement suppression may subsequently provide delayed or aggregated acknowledgements with respect to the received frames. Further, a transmitter may instruct the receiver to suppress the acknowledgements and to not send any acknowledgments to the transmitted frames.

At step 342 receives a subsequent frame of the plurality of frames at a reduced interframe spacing interval. Each of the subsequent frames may include a reduced interframe spacing indicator, in this regard, each of the frames may be considered for inclusion of such a indicator, or in the alternative, the subsequent frames of the plurality frames be received and processed in order with the presumption that the RIFS receive mode applies while frames are received within a RIFS interval.

Figure 10:
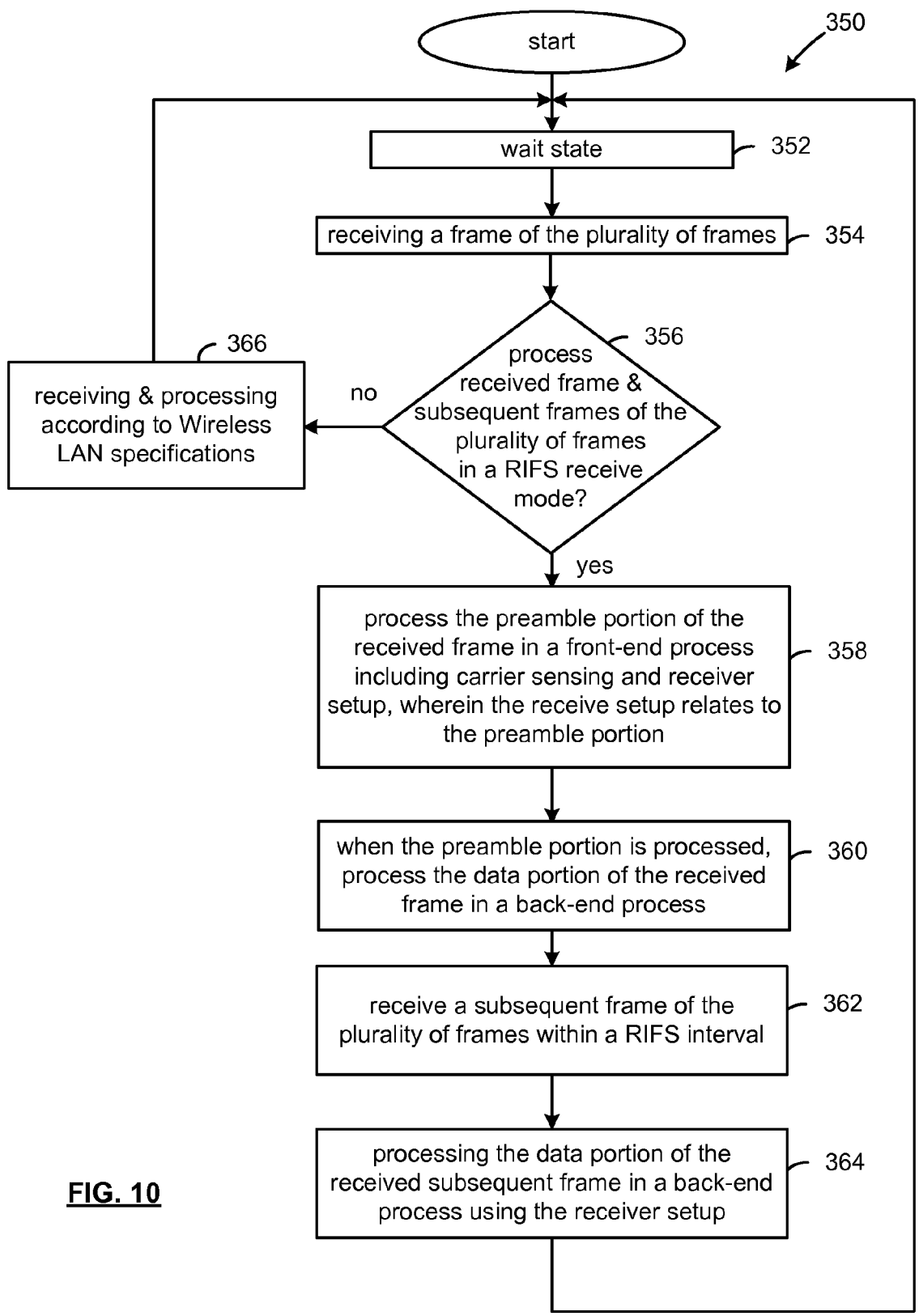
FIG. 10 is a flow diagram illustrating another method for receiving a plurality of frames in a wireless LAN in a RIFS receive mode according to an embodiment of the invention.

FIG. 10 is a flow diagram illustrating another method 350 performed by a receiver in a Wireless Local Area Network ("LAN") for receiving a plurality of frames. Each of the frames includes a preamble portion and a data portion. At step 352, the destination station is in a wait state for a frame and/or fragment. The destination station exits the wait state to receive a frame of a plurality of frames at step 354. A determination is made whether to process the received frame and subsequent frames of the plurality of frames in a Reduced InterFrame Spacing ("RIFS") receive mode at step 356.

When the frames, and subsequent frames, are not in an RIFS receive mode, the destination receives and processes the plurality of frames, at step 366, according to the protocols and interframe spacings in accordance with a particular wireless communication standard or protocol (for example, IEEE 802.11a, IEEE 802.11b, 802.11g, Bluetooth, etc.). Following reception and processing of the frames, the destination station returns to the wait state 352.

When in the RIFS receive mode, at step 358, the destination station processes the preamble portion of the received frame in a front-end process, including carrier sensing and receiver setup, wherein the receiver setup relates to the preamble portion. When the preamble portion is processed, the destination station processes the data portion of the received frame in a back-end process. At step 362 the destination receives a subsequent frame of the plurality of frames within a RIFS interval, and the data portion of the received subsequent frame is processed in a back-end process using the receiver setup at step 364. Following reception and processing of the frames in the RIFS receive mode, the destination station returns to the wait state 352.

With respect to step 362, an additional step may be included with respect to processing of the preamble; however, because the receiver setup for the plurality of frames is substantially established in step 358, processing of the subsequent frames in the front-end process can be reduced to carrier sensing, which can be included as a component of receiving a subsequent frame, and the decoding and processing of a signal field as it applies to the data portion of the frame may be conducted in the back-end process for processing of the data portion. Accordingly, as an option, a front-end process may be included to provide fine adjustment to the receiver setup, via processing the long training symbols, for refinement of the receiver setup for processing of a subsequent frame. Also, the decoding and processing of the signal field may be included in the front-end processing under such circumstances (that is, to balance or otherwise adjust the processing load between the front-end process and the back-end process).

Figure 11:
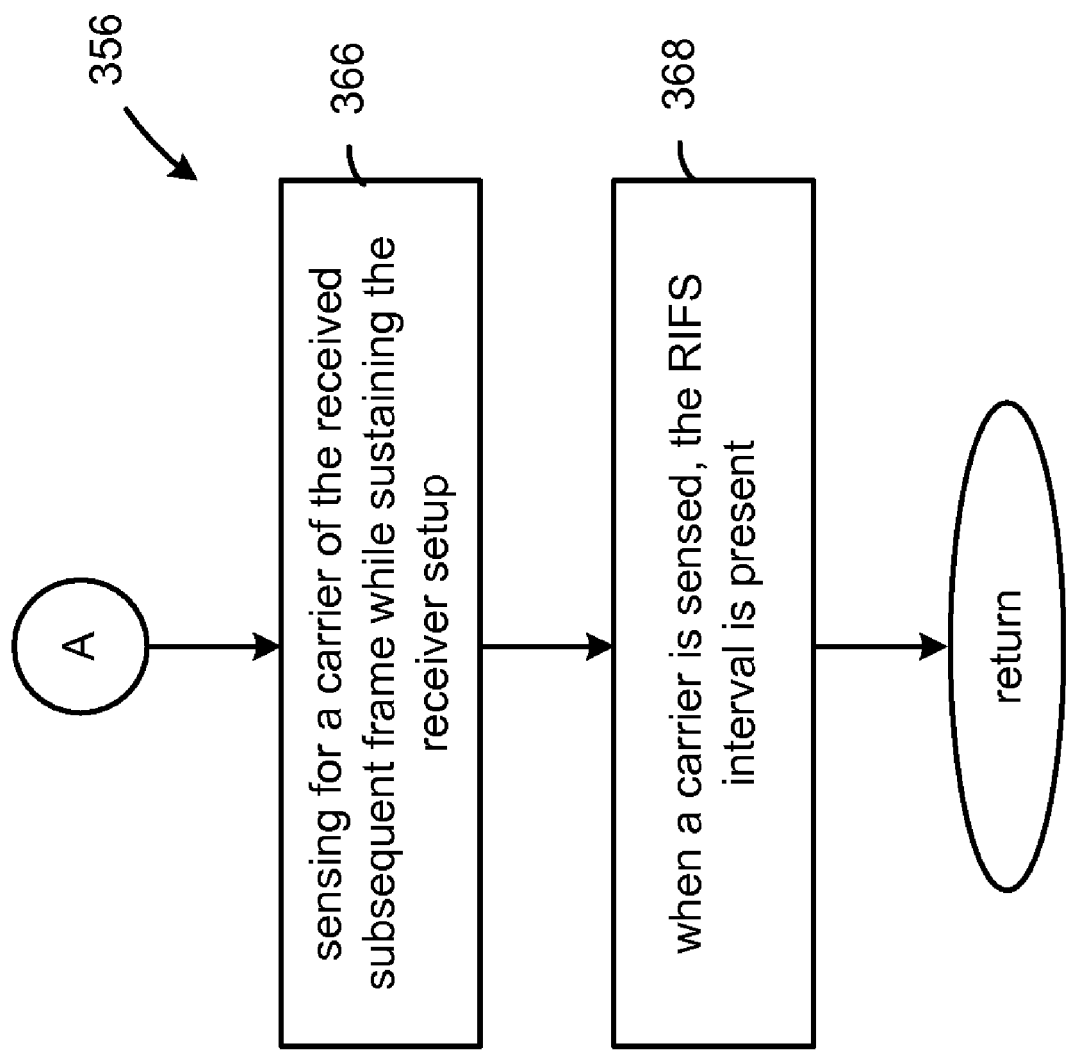
FIG. 11 is a flow diagram illustrating a method for determining whether to process a plurality of frames in a RIFS receive mode of FIG. 10.

FIG. 11 is a flow diagram illustrating a method 356 for determining whether to process the plurality of frames in a RIFS receive mode of FIG. 10. The method includes sensing for a carrier of the received subsequent frame while sustaining the receiver setup at step 366. When a carrier is sensed, at step 368 the RIFS interval is present, and the plurality of frames are processed in a RIFS receive mode. Following the determination, the method 356 returns to the method 350 of FIG. 10.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention

What is claimed is:

1. Apparatus for receiving a plurality of frames in a Wireless Local Area Network, each frame of the plurality of frames including a preamble portion and a data portion, comprising:
    a radio front end operable to produce an inbound continuous waveform signal, the radio front end including circuitry operable to receive a radio frequency ("RF") signal, downconvert the received RF signal to one of a baseband or intermediate frequency signal, filtration circuitry to filter noise and unwanted frequency components, and amplification circuitry to amplify the RF and downconverted signals;
    analog-to-digital conversion circuitry for converting the inbound continuous waveform signal from an analog domain to an inbound digital signal; and
    wherein the apparatus functions to:
        receive a frame of the plurality of frames;
        determine whether to process the received frame in a Reduced InterFrame Spacing ("RIFS") receive mode; and
        when in the RIFS receive mode,
            process the preamble portion of the received frame in a front-end process including carrier sensing and configuring a receiver setup of a physical ("PHY") layer;
            process the data portion of the received frame in a back-end process after processing the preamble portion;
            receive a subsequent frame of the plurality of frames within a RIFS interval based upon a modulation type of the plurality of frames; and
            process the data portion of the received subsequent frame in the back-end process using the receiver setup based upon a previously received frame without tearing down the receiver setup of the PHY layer.

2. The apparatus of claim 1 wherein when the carrier of the subsequent frame is sensed, finely adjusting the receiver setup including adjusting channel estimation and fine frequency acquisition based upon a portion of the preamble of the subsequent received frame.

3. The apparatus of claim 1 further functions to process the data portion of the received frame in the back-end process while receiving the subsequent frame.

4. The apparatus of claim 1 wherein the plurality of frames includes a frame fragment.

5. The apparatus of claim 1 wherein the determining whether to process the received frame in the RIFS receive mode by evaluating a RIFS indicator included with the received frame.

6. The apparatus of claim 1 wherein the determining whether to process the received frame in the RIFS receive mode by monitoring a channel of the WLAN.

7. Apparatus for receiving a plurality of frames in a Wireless Local Area Network, each frame of the plurality of frames including a preamble portion and a data portion, the apparatus comprises:
    a radio front end for producing an inbound continuous waveform signal;
    analog-to-digital conversion circuitry for converting the inbound continuous waveform signal from an analog domain to an inbound digital signal;
    a baseband processing module operably disposed to receive and process the inbound digital signal; and
    memory operably coupled to the baseband processing module, wherein the memory stores operational instructions that cause the processing module to:
        receive a frame of the plurality of frames;
        determine whether to process the received frame and subsequent frames of the plurality of frames in a Reduced InterFrame Spacing ("RIFS") receive mode;
        when in the RIFS receive mode, process the preamble portion of the received frame in a front-end process including carrier sensing and receiver setup, wherein the receiver setup relates to the preamble portion;
        when the preamble portion is processed, process the data portion of the received frame in a back-end process;
        receive a subsequent frame of the plurality of frames within a RIFS interval, wherein the RIFS interval is based upon a modulation type of the plurality of frames; and
        processing the data portion of the received subsequent frame in the back-end process using the receiver setup based upon a previously received frame.

8. The apparatus of claim 7 wherein when the carrier is sensed, finely adjusting the receiver setup including channel estimation and fine frequency acquisition based upon a portion of the preamble of the received subsequent frame.

9. The apparatus of claim 7 wherein processing of the data portion of the received frame in the back-end process continues while receiving the received subsequent frame.

10. The apparatus of claim 7 wherein the plurality of frames includes a frame fragment.

11. The apparatus of claim 7 wherein the determining whether to process the received frame and subsequent frames of the plurality of frames in the RIFS receive mode is based upon a RIFS indicator included with the received frame.

12. The apparatus of claim 7 wherein the determining whether to process the received frame and subsequent frames of the plurality of frames in the RIFS receive mode is based upon monitoring a channel of the WLAN.

* * * * *